Oct. 19, 1926.
W. SEVILLE
1,603,719
RADIAL FRICTION CLUTCH
Filed March 7, 1925    2 Sheets-Sheet 1
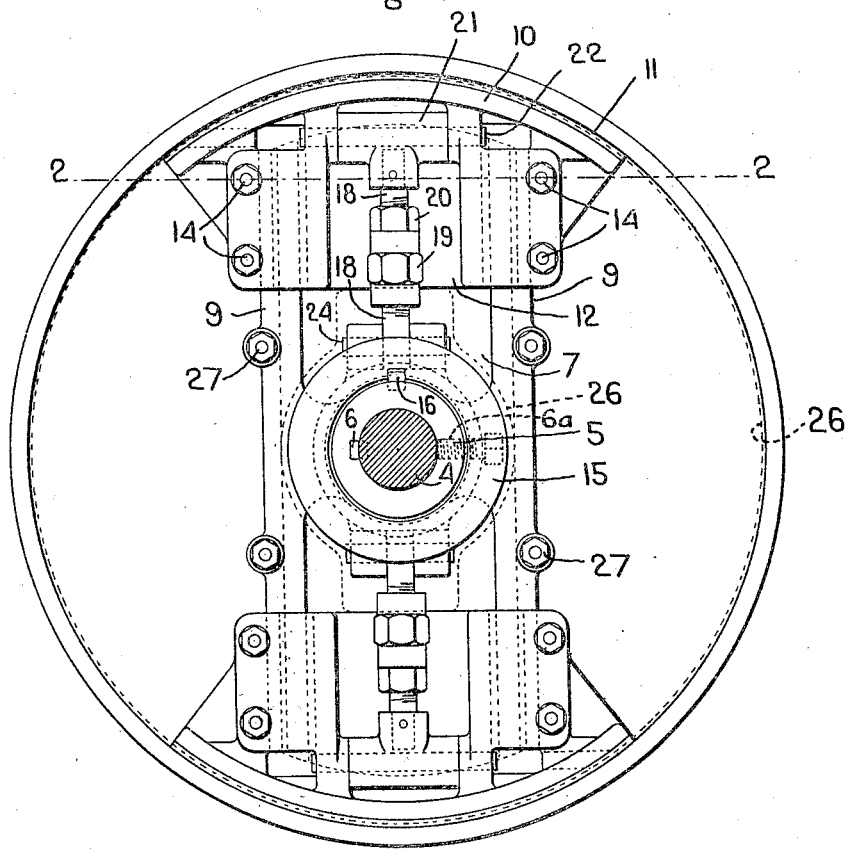
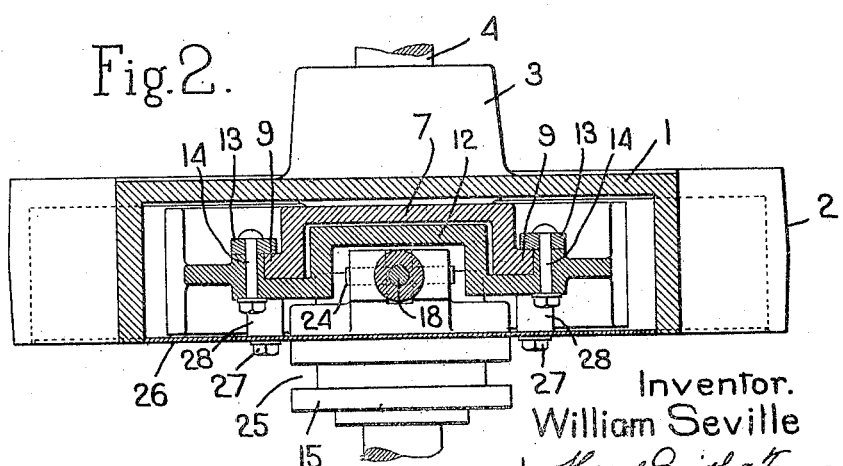
Inventor.
William Seville
by Heard Smith & Tennant
Attys.

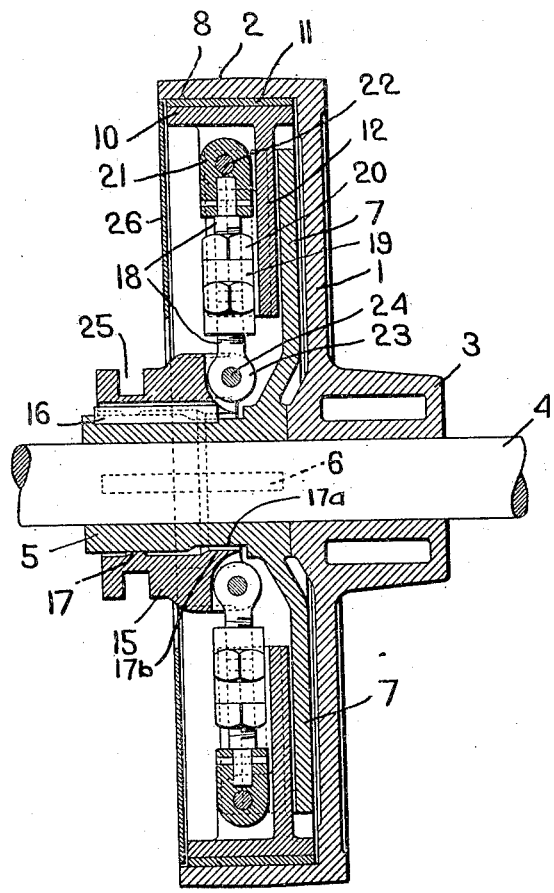

Patented Oct. 19, 1926.

1,603,719

UNITED STATES PATENT OFFICE.

WILLIAM SEVILLE, OF HOPEDALE, MASSACHUSETTS, ASSIGNOR TO DRAPER CORPORATION, OF HOPEDALE, MASSACHUSETTS, A CORPORATION OF MAINE.

RADIAL FRICTION CLUTCH.

Application filed March 7, 1925. Serial No. 13,706.

This invention relates to a friction clutch device of the internal radial type such as may be used for various purposes, and which is particularly designed for connecting and disconnecting the pulley or driving element and the crank shaft of a loom.

The object of the invention is to produce a mechanism of this type which shall exert, when in clutching position, no end thrust on the driving shaft or the bearings of the driving shaft.

The object of the invention is further to provide a construction presenting widely spaced, rugged, guiding connections between the clutch shoes and the shaft so as to transmit the torque directly and without loss of power.

The object of the invention is further to provide a construction in which the clutching force exerted between each clutch shoe and the driving element shall be automatically equalized.

The object of the invention is further to provide a construction in which the clutch shoes are prevented from coming into contact with the driving element or pulley when the parts are in unclutched position.

These and other objects and features of the invention will appear more fully from the accompanying description and drawings and will be particularly pointed out in the claims.

The invention is shown in a simple and preferred form adapted for use in connecting and disconnecting the pulley or other driving element to and from the driving shaft of a machine such as a loom. While a pulley is illustrated as the driving element, it is obvious that any rotating member, however actuated, may be employed and that either the shaft or the rotating member may be the one to which the driving power is applied.

In the drawings:

Fig. 1 is an elevation of the device with the shaft shown in cross section and with the dust or cover plate removed.

Fig. 2 is a view in cross section taken on the line 2—2 of Fig. 1 with the dust or cover plate in position.

Fig. 3 is a view of the device taken in central, vertical longitudinal section.

The element 1 is shown as a pulley having a face 2 adapted to receive a belt and a hub 3, mounted upon and to rotate with respect to the other element 4, shown as a shaft. The shaft 4 may be the main shaft of a loom or other machine so that when the pulley is clutched to this shaft 4, rotation will be imparted thereto, or, as already pointed out, the shaft 4 may be the driving element imparting rotation to the face 2 when it is clutched to the pulley 1. For convenience of description, it will be assumed that the pulley 1 is the element to which power is applied.

One feature of the invention consists of a spider comprising the hub 5 rigidly secured to the shaft 4 as by the key 6 and set screw $6^a$. This hub is provided with a pair of oppositely disposed radial arms 7 extending well towards the cylindrical surface 8 of the rim of the pulley 1. The essential feature of these arms is that each presents widely separated parallel guiding edges 9 upon which the clutch shoes slide. In the preferred construction each arm 7 is channel-shaped and thus presents a heavy, rigid structure well adapted to receive and transmit the driving torque.

The construction of each radial arm and the construction of each clutch shoe is the same. Each clutch shoe comprises an arcuate flanged head 10, adapted to fit against the cylindrical surface 8 of the pulley rim. A slightly compressible friction facing 11 is provided between the cylindrical rim and the clutch shoe and secured to one of said elements. Preferably this facing 11 is secured to the clutch shoe, and it may be made of any usual and suitable material. Each clutch shoe is provided with a radial guide arm 12 adapted to fit over and guide upon the guiding edges 9 of the corresponding radial arm of the spider. In the preferred construction, this guide arm 12 is also channel-shaped and telescopes within the corresponding radial arm 7, as shown in Fig. 2. This channel-shaped guide arm 12 extends around and over the guiding edges 9, and guide plates 13 are secured by bolts 14 to the guide arm 12, so as to form an interlocking fit with the guiding edges 9 of the channel-shaped radial arm of the spider. It will thus be seen that the clutch shoes are guided accurately radially of the shaft to effect the clutching and unclutching action.

The sleeve 15 is mounted to slide upon and to rotate with the shaft 4 and for that purpose, preferably, is mounted to slide upon and rotate with the hub 5 of the spider. This sleeve 15 is keyed at 16 to the spider and is so arranged as to be capable of a slight transverse rocking movement on the hub 5 during the latter part of the movement of the sleeve in the clutching operation and to be held firmly against any such transverse rocking movement when in and near unclutched position. For these purposes the bore of the sleeve 15 is made slightly larger than the spider hub 5 at the outer section and a circumferential rib 17 is provided between the sleeve and the hub, being formed, in the illustrated case, upon the interior surface of the sleeve; while the inner section 17$^a$ of the spider hub 5 is made of slightly smaller diameter than the outer section and the inner section 17$^b$ of the sleeve bore is of substantially the same diameter as the outer section of the hub 5.

A single, central, radially disposed, longitudinally adjustable thrust member is provided for each clutch shoe, pivoted at one end on the shoe and at the other end on the sleeve. This insures the accurate, symmetrical, equal movement of each clutch shoe. This thrust member is shown as a two-part threaded rod 18 connected by a turnbuckle construction shown as a right and left-hand threaded nut 19 with a lock nut 20. The pivotal connection between the shoe and the rod 18 is secured by a T-shaped head 21 journalled on a stud 22 in the clutch shoe and in which the end of the rod is seated. The connection between the rod 18 and the sleeve 15 is shown as secured by an enlarged head 23 of the rod journalled on a stud 24 in the sleeve 15.

The parts are shown in clutching position in the drawings, and it will be noted that in this position the arrangement is such that the thrust members extend radially of the shaft and at right angles thereto, and that the axis of thrust is substantially midway of the face or clutching surface of the clutch shoe, so that a very firm and rigid clutching action is secured. These thrust members act much after the manner of a toggle joint and by means of the longitudinal adjustment provided in each, and the slight compressible quality of the facing 11, the required position of the thrust members, when clutching engagement is effected, is readily secured.

The sleeve 15 is slid back and forth on the hub to effect the clutching and unclutching action in any suitable manner, and for that purpose is shown provided with a circumferential groove 25 to receive a yoke or other actuator. It will be seen that when the sleeve is slid away from the pulley, the thrust members will slide the clutch shoes radially toward the shaft, thus releasing the pulley. When the sleeve is slid in the opposite direction, the clutch members slide radially, and as the thrust members assume their final position at right angles with the shaft, a very powerful force is exerted to bring and hold them in engagement with the cylindrical rim of the pulley. Furthermore, it will be seen that when the parts are in clutching engagement, there is no end thrust resulting from the force exerted to hold the clutch shoes in engagement with the pulley, so that there is no tendency to shift the shaft longitudinally and no tendency to produce end thrust upon the bearings of the shaft.

The slight transverse and rocking movement of the sleeve 15, as upon the rib 17 during the latter portion of the clutching movement, insures that the forces imparted to the clutch shoes through the thrust members shall be equalized under all conditions. Again, when the sleeve is slid to bring the parts into unclutching position, the inner section 17$^b$ of the sleeve slides onto the outer section of the hub 5 and, together with the circumferential rib 17, maintains the sleeve concentric with the hub. Thus, when in and near unclutched position, the clutch shoes are both maintained equidistant from the cylindrical rim of the pulley and there is no danger of the shoes, or either of them, being accidentally thrown into contact with the pulley rim while the pulley is running free.

The heavy, rugged construction of the radial spider arms and the guide arms of the clutch shoes with the widely separated guiding surfaces between the radial arms and the clutch shoes presents a very firm and rigid construction, and one which transmits the torque between the pulley and the shaft in the most efficient manner and without loss of power. The preferred channel shape of the radial arms of the spider and the guide arms of the clutch shoes provide the requisite space, in a simple manner, for the thrust members to be positioned with the axis of thrust located transversely midway of the clutch shoes.

The entire clutch mechanism is preferably enclosed by a suitable dust or cover plate 26, shown in Figs. 2 and 3 and indicated in dotted lines in Fig. 1. This plate is held in position by nuts 27 on posts 28 projecting from the radial arms of the spider.

Having thus described the invention, what is claimed as new, and desired to be secured by Letters Patent, is:

1. A friction clutch device comprising a shaft; a pulley, having a cylindrical rim, rotatably mounted on the shaft; a spider secured to the shaft, and having a pair of oppositely disposed, radial arms with widely separated parallel, guiding edges; diametrically disposed, similar, clutch shoes each adapted to seat against the inside of said rim and fitting and slidable upon the guiding edges of the corresponding radial arm; a sleeve on the shaft rotatable therewith and slidable with respect thereto; a single, central, radially disposed, longitudinally adjustable, thrust member for each clutch shoe, pivoted at one end on the shoe and at the other end on the sleeve, and means permitting the sleeve to have a slight, transverse, rocking movement during the latter portion of its movement into clutching position and maintaining the sleeve concentric with the shaft when in unclutched position whereby the pressure between the clutch shoes and pulley rim is equalized when in clutching position and the clutch shoes and pulley rim are prevented from contacting when in unclutched position.

2. A friction clutch device comprising a shaft; a pulley, having a cylindrical rim, rotatably mounted on the shaft; a spider having a hub secured to the shaft and a pair of oppositely disposed, radial arms with widely separated, parallel guiding edges; diametrically disposed, similar clutch shoes each adapted to seat against the inside of said rim and fitting and sliding upon the guiding edges of the corresponding radial arm; a sleeve mounted to slide on the hub of the spider and keyed thereto; a single, central, radially disposed, longitudinally adjustable, thrust member for each clutch shoe pivoted at one end on the shoe and at the other end on the sleeve; and means permitting the sleeve to have a slight, transverse, rocking movement on the spider hub during the latter portion of its movement into clutching position to insure equalization of the pressure between the clutch shoes and the pulley rim.

3. A friction clutch device comprising a shaft; a pulley, having a cylindrical rim, rotatably mounted on the shaft; a spider having a hub secured to the shaft and a pair of oppositely disposed, radial arms with widely separated, parallel guiding edges; diametrically disposed, similar clutch shoes each adapted to seat against the inside of said rim and fitting and sliding upon the guiding edges of the corresponding radial arm; a sleeve mounted to slide on the hub of the spider and keyed thereto; a single, central, radially disposed, longitudinally adjustable, thrust member for each clutch shoe pivoted at one end on the shoe and at the other end on the sleeve; and means permitting the sleeve to have a slight, transverse, rocking movement on the spider hub during the latter portion of its movement into clutching position and maintaining the sleeve concentric with the hub when in unclutched position whereby the pressure between the clutch shoes and the pulley rim is equalized when in clutching position and the clutch shoes and pulley rim are prevented from contacting when in unclutched position.

4. A friction clutch device comprising a shaft, a pulley, having a cylindrical rim, rotatably mounted on the shaft; a spider having a hub secured to the shaft and a pair of oppositely disposed, channel-shaped, radial arms with widely separated, parallel, guiding edges; diametrically disposed, similar, clutch shoes each adapted to seat against the inside of said rim and each having a channel-shaped, guide arm telescoping the corresponding spider arm and interlocking with the guiding edges thereof; a sleeve mounted to slide on the spider hub and keyed thereto; a single, central, radially disposed, thrust member for each clutch shoe pivoted at one end on the shoe and at the other end on the sleeve and located, when in clutching position, in the telescoped channels of the radial spider arm and clutch shoe guide arm with its axis of thrust transversely midway of the clutch shoe; and means permitting the sleeve to have a slight, transverse, rocking movement with respect to the spider hub during the latter portion of the movement of the sleeve into clutching position to insure equalization of the pressure between the clutch shoes and pulley rim.

5. A friction clutch device comprising a shaft, a pulley, having a cylindrical rim, rotatably mounted on the shaft; a spider having a hub secured to the shaft and a pair of oppositely disposed, channel-shaped, radial arms with widely separated, parallel, guiding edges; diametrically disposed, similar, clutch shoes each adapted to seat against the inside of said rim and each having a channel-shaped, guide arm telescoping the corresponding spider arm and interlocking with the guiding edges thereof; a sleeve mounted to slide on the spider hub and keyed thereto; a single, central radially disposed, thrust member for each clutch shoe pivoted at one end on the shoe and at the other end on the sleeve and located, when in clutching position, in the telescoped channels of the radial spider arm and clutch shoe guide arm with its axis of thrust transversely midway of the clutch shoe and means permitting the sleeve to have a slight, transverse, rocking movement with respect to the spider hub during the latter portion of the movement of the sleeve into clutching position and maintaining the sleeve concentric with the hub when in unclutched position whereby the pressure between the clutch shoes and the pulley rim is equalized when in clutching position and the clutch shoes and pulley rim are prevented from contacting when in unclutched position.

6. A friction clutch device comprising a shaft, a pulley, having a cylindrical rim, rotatably mounted on the shaft; a spider having a hub secured to the shaft and a pair of oppositely disposed, channel-shaped, radial arms with widely separated, parallel, guiding edges; diametrically disposed, similar, clutch shoes each adapted to seat against the inside of said rim and each having a channel-shaped, guide arm telescoping the corresponding spider arm and interlocking with the guiding edges thereof; a sleeve mounted to slide on the spider hub and keyed thereto, the bore of the sleeve being slightly larger than the spider hub; a circumferential rib between the sleeve and the hub to permit a slight, transverse, rocking movement of the sleeve on the hub during the latter portion of the movement of the sleeve into clutching position; and a single, central, radially disposed, thrust member for each clutch shoe pivoted at one end on the shoe and at the other end on the sleeve and located, when in clutching position, in the telescoped channels of the radial spider arm and clutch shoe guide arm with its axis of thrust transversely midway of the clutch shoe, the said sleeve and hub construction insuring equalization of the pressure between the clutch shoes and pulley rim.

7. A frictional clutch device comprising a shaft; a pulley, having a cylindrical rim, rotatably mounted on the shaft; diametrically disposed, similar, clutch shoes each adapted to seat against the inside of the rim; a sleeve rotatable with, and slidable with respect to, the shaft; similar thrust connections between each clutch shoe and the sleeve; and means permitting the sleeve to have a slight, transverse, rocking movement during the latter portion of its sliding movement into clutching position and maintaining the sleeve concentric with the shaft when in unclutched position whereby the pressure between the clutch shoes and pulley rim is equalized when in clutching position and the clutch shoes and pulley rim are prevented from contacting when in unclutched position.

8. In a radially acting friction clutch device a hub; a sleeve mounted on the hub to rotate with, and slide with respect to, the hub; the outer section of the bore of the sleeve being of greater diameter than the outer section of the hub; a circumferential rib between said outer sections; and the inner section of the bore of the sleeve being of greater diameter than the inner section of the hub and substantially the same diameter as the outer section of the hub, whereby when the sleeve is slid inwardly with respect to the hub, it may have a transverse rocking movement with respect thereto and when slid outwardly it will be maintained concentric with the hub.

In testimony whereof, I have signed my name to this specification.

WILLIAM SEVILLE